United States Patent
Walter (10) Patent No.: US 8,220,190 B2
(45) Date of Patent: Jul. 17, 2012

(54) HOLDING DEVICE FOR A POSTER-SHAPED INFORMATION SUPPORT

(75) Inventor: Herbert Walter, Müllheim (DE)

(73) Assignee: Visplay International AG, Muttenz (CH)

( * ) Notice: Subject to any disclaimer, the term of this patent is extended or adjusted under 35 U.S.C. 154(b) by 101 days.

(21) Appl. No.: 12/747,431

(22) PCT Filed: Dec. 8, 2008

(86) PCT No.: PCT/CH2008/000522
§ 371 (c)(1),
(2), (4) Date: Jun. 10, 2010

(87) PCT Pub. No.: WO2009/073997
PCT Pub. Date: Jun. 18, 2009

(65) Prior Publication Data
US 2010/0269385 A1    Oct. 28, 2010

(51) Int. Cl.
G09F 7/00 (2006.01)
(52) U.S. Cl. .................................. 40/611.06; 40/606.18
(58) Field of Classification Search ............ 40/606.18, 40/611.06, 611.12, 611.07, 661, 734; 248/473; 24/72.7
See application file for complete search history.

(56) References Cited

U.S. PATENT DOCUMENTS

| | | | | |
|---|---|---|---|---|
| 1,462,790 A | * | 7/1923 | Fink | 40/611.01 |
| 1,857,552 A | * | 5/1932 | Komorous | 248/473 |
| 2,540,221 A | * | 2/1951 | Ten Hoeve et al. | 40/661 |
| 3,102,351 A | * | 9/1963 | Howell | 40/611.04 |
| 3,924,344 A | * | 12/1975 | Davis | 40/592 |
| 4,282,667 A | * | 8/1981 | Glade | 40/649 |
| 5,058,300 A | * | 10/1991 | Ernest et al. | 40/611.12 |
| 5,331,757 A | * | 7/1994 | Ernest et al. | 40/611.12 |
| 5,625,969 A | * | 5/1997 | Vogler | 40/611.12 |
| 5,906,064 A | * | 5/1999 | Field | 40/607.11 |
| 5,911,525 A | * | 6/1999 | Jepsen et al. | 40/611.06 |
| 6,298,592 B1 | * | 10/2001 | Baier | 40/611.07 |
| 7,765,729 B2 | * | 8/2010 | Thurston | 40/661 |
| 2004/0177541 A1 | * | 9/2004 | Malecker | 40/611.06 |

FOREIGN PATENT DOCUMENTS

| | | |
|---|---|---|
| DE | 299 21 990 U1 | 3/2000 |
| GB | 1193763 | 6/1970 |
| JP | 2003 167514 | 6/2003 |
| JP | 2004 361763 | 12/2004 |
| JP | 2005 181708 | 7/2005 |

OTHER PUBLICATIONS

Extract from "vitrashop Journal" of Vitrashop International AG, CH-4127 Birsfelden/Switzerland (year of publication 1993), front page, p. 65 and back cover (3 pages).
Extract from "vitrashop what's new" of Vitrashop International AG, CH-4127 Birsfelden/Switzerland (year of publication 1996), front page, pp. 12 and 13 and back cover (4 pages).

* cited by examiner

*Primary Examiner* — Lesley D Morris
*Assistant Examiner* — Kristina Junge
(74) *Attorney, Agent, or Firm* — McCarter & English, LLP

(57) ABSTRACT

Disclosed is a holding device (1) for a poster-shaped information carrier, comprising two board segments (2) for receiving the information carrier therebetween, at least one of the board segments (2) being transparent in order for the information support to be visible. A base (3) is used for inserting the two board segments (2). A means (4) is provided for leaving a gap between the two board segments (2) for receiving the information carrier. Said means (4) for leaving the gap (20) between the two board segments (2) is a web which is arranged within the base (3) and extends between the board segments (2), and/or a spacing element (4) that lies between the board segments (2).

9 Claims, 9 Drawing Sheets

HOLDING DEVICE FOR A POSTER-SHAPED INFORMATION SUPPORT

FIELD OF APPLICATION OF THE INVENTION

The invention relates to a holding device for a poster-shaped information carrier for imparting information to the beholder. On the information carrier, factual notices, offer notices and advertising notices of all kinds can be indicated, for example article, manufacturer, size, quantity and price information on offered products, or the scope and conditions of performance for offered services. The information carrier can be printed with script characters and/or graphic symbols and/or inscribed by hand. A typical use of the holding device would be, for example, a goods stand in a department store.

PRIOR ART

From the trade publication "vitrashop-Pin" of Vitrashop AG, Birsfelden/CH (year of publication 1993), p. 65, a holding device for a poster-shaped information carrier is known. This holding device is made from U-profile into a U-shaped, upwardly open frame. The horizontal base member and the two upwardly extending side members of the frame form with the grooves of the U-profile, which grooves face into the interior of the frame, a mount, into which the poster-shaped information carrier—for example a printed board or a plastics sheet—can be inserted from above. Fitted to the base member are two mutually spaced clamps, so that the holding device can be placed onto the top edge of a panel or onto a brace of a shelf and fastened. This device calls for a frame which encompasses the poster-shaped information carrier from below and on both sides at least in 50% measure in order to hold the information carrier reliably and without arising instability. As a modification, the U-shaped frame is designed open to one side, so that the information carrier can then be inserted laterally. A frame which is in this way relatively solid is esthetically not suitable for all applications. For instance, for the presentation of discreet goods, such as jewelry or nightwear, a suitable delicate holding device would be desirable. A shortcoming with the known holding device consists also in the fact that, for a different format of the poster-shaped information carrier, even given a mere changeover from landscape to portrait format, a correspondingly dimensioned holding device is necessary.

A further holding device for a poster-shaped information carrier is disclosed in the trade publication "vitrashop-what's new" of Vitrashop AG, Birsfelden/CH (year of publication 1996), p. 13. This holding device likewise consists of a U-profile, but two members, spanning a plane, are put together to form a rectangular frame. Extending in continuation of the vertical member is an extension rod, on which the angle bracket is disposed. Of the information carrier, generally, once again, a printed board, a corner is inserted into the angle bracket. In the groove of the U-profile forming the angle bracket there is a two-way grid of elevations, so that the edge of the information carrier inserted in the groove is held tightly in the grid. The frame of this holding device encompasses the information carrier less than a three-sided U-shaped frame, yet the angular frame continues to be clearly apparent. As a result of the lateral protrusion of the frame, an asymmetry, however, is now obtained. Moreover, although the angular frame allows information carriers to be inserted into a certain range of varying formats, because of the asymmetric clamping in just one corner of the information carrier, the fixing of the information carrier is not particularly secure.

Finally, DE 299 21 990 U1 discloses a holding device for a poster-shaped information carrier, which possesses a base and a flat poster support which can be inserted into the base. The information carrier preferably has the form of an envelope which is closed on three sides and is open only on its bottom edge and can be slipped over the poster support from above. For the reception of the sandwich arrangement, made up of poster support, information carrier and a possibly slipped over transparent poster sleeve, the bar-shaped base has at the top a continuous transverse groove. Extending into the cross-sectional depth of the base is a tongue groove for receiving a tongue on the poster support. Seated in a spring groove is a spring element, which engages with its spring boss latchingly in the opening in the tongue of the inserted poster support, which tongue is accommodated in the tongue groove.

OBJECT OF THE INVENTION

The object of the invention is to propose an improved holding device for poster-shaped information carriers. It is here a matter of simplifying the equipping of the holding device with an information carrier, or the changing thereof. The holding device to be provided is designed to be able to be positioned, displaced and removed at a wide variety of sites with just a few maneuvers, i.e. to be suitable for set-up, insertion, suspension or other fastening. Finally, the holding device must be able to be produced in various dimensions and formats cost-effectively in relatively large numbers.

SUMMARY OF THE INVENTION

The holding device for a poster-shaped information carrier has, first of all, two sheet segments for receiving the information carrier therebetween, at least one of the sheet segments being transparent in order for the information carrier to be visible. For the insertion of the two sheet segments, a base is used. A means is provided for maintaining a gap between the two sheet segments for the reception of the information carrier.

Specific embodiments of the invention are defined below:
The means for maintaining the gap between the two sheet segments is a web which is arranged in the base and juts between the sheet segments, and/or a spacing element, which lies between the sheet segments. The base is configured in principle as a U-profile with two side members, which act as a leaf spring and enclose between them a free space which is open on one side. Extending from each of the side members is a branch, which branches are directed one toward the other and merge respectively into a flank, the two flanks being bridged by a transverse web and having between them a screw channel which is open facing away from the free space. The respectively two branches and flanks with the transverse web delimit the free space in a meandering pattern. Each side member possesses a latching contour pointing to the entrance into the free space. The web rises up centrally from the transverse web into the free space. The side members respectively extend with a projecting length beyond the respectively associated branch and form with this a shoulder. The two shoulders lie in one plane and run up to the mouth of the screw channel. The shoulders with the screw channel can be used to fasten a connecting part of an adapter. The base consists of an extruded profile, preferably of aluminum.

The two sheet segments are identical, namely have the same shaping and consist of the same transparent material, preferably plastic or glass. The thickness of the sheet segments corresponds to the clear width between a side member and the web. The sheet segment has respectively in the region of the base, on both outer edges, a first recess. A clearance cut extends beyond the first recess along the outer edge, on the one hand continuously as far as the bottom edge and on the other hand over a short distance in the direction of the second recess. Outside the base, the sheet segment has at least on one of its outer edges a second recess, which serves as a grip recess for the grasping of an information carrier present in the holding device and/or for the application of a clamping part to the information carrier.

The two sheet segments of a holding device each have outside the base on the two opposing outer edges, at equal distance to the base, a second recess, which recesses are positioned congruent to each other and are preferably semicircular. The clamping part has complementary to the contour of the second recess two jaws interconnected by a bridge, which jaws can be closed in the manner of a clip in order to encompass the information carrier on both sides in the region of the second recess, and thus fix it in place.

At each end, the base is respectively provided with a corner part, which serves to cover the cut faces at the ends of the base and to fix the two sheet segments present in the base. The one-piece corner part has a first angle segment and a second angle segment, between which, on the inner side, a rib extends, which can be fitted laterally into the screw channel.

The first angle segment is intended to bear against the shoulders of the base and additionally has a hole for the introduction of a screw which engages in the screw channel. The second angle segment has on the inner side a projection, from which rises a blade-shaped pin. The projection engages in the two first recesses of the two adjacently positioned sheet segments, the pin juts, in alignment with the web of the base, between the sheet segments and the thickness of the second angle segment fits into the clearance cut, whereby the outer face of the second angle segment terminates flush with the outer edges of the sheet segments.

A plate-like spacing element is provided, which in the assembled state is seated on the web of the base between the two sheet segments and between the pins of the mounted corner parts that jut in on both sides, and which preferably consists of colorless transparent plastic. The sheet segments inserted in the base are seated on the transverse web of the base. That edge of the spacing element which points away from the base forms a stop for the inserted information carrier. The holding device can be positioned with the base beneath or above or lateral to the sheet segments. The supporting structure is a plate-like or tubular stand, a panel, a rack, a rear wall or a ceiling, and between the base an adapter can be used for connection to the supporting structure. The adapter possesses a connecting part, which is intended for joining to the two-part shoulder and fixing to the screw channel of the base. The adapter has a connecting contour for releasable docking to the supporting structure.

EXEMPLARY EMBODIMENT

With reference to the appended drawings, the detailed description of an illustrative embodiment of the holding device according to the invention for a poster-shaped information carrier in various variants, modified in terms of detail, is given below.

Additional components for the different application of the holding device, and the advantageous completion thereof, are further described.

For the whole of the further description, the following stipulation applies: If reference symbols are contained in a figure for the purpose of diagrammatic clarity, but are not explained in the directly associated description text, then reference is made to the mention thereof in preceding or following figure descriptions. In the interest of clarity, the repeated designation of components is generally dispensed with in further figures insofar as it is diagrammatically clearly apparent that "recurring" components are involved.

FIGS. 1A to 1J

Figure 1A:
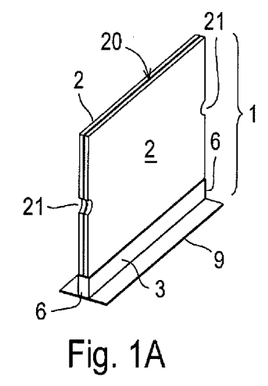
FIG. 1A shows a holding device according to the invention in vertical set-up with the base beneath the sheet segments, supported by a plate-like stand as the supporting structure, in perspective view.

A first typical application of the holding device 1 according to the invention for a poster-shaped information carrier for conveying information to customers about, for example, the nature, origin and price of the offered goods is the vertical set-up, with the base 3 beneath the sheet segments 2, supported by a plate-like stand as the supporting structure 9 (see FIG. 1A). Two like-constituted sheet segments 2 of rectangular shaping are inserted from above in landscape format, lying congruently adjacent to each other, with their bottom edges into the base 3. Between the sheet segments 2 there remains an areal gap 20 for receiving the poster-shaped information carrier 7 (see FIGS. 7A, 7B). For the coverage of the cut faces at the ends of the base 3, a corner part 6 is respectively put on. Above the base 3 is found on each of the mutually opposing outer edges of the sheet segments 2 a second recess 21, which serves as a grip recess for grasping of an information carrier present in the holding device 1 and/or for application of a clamping part 5 (see FIGS. 9, 10A-11) to the information carrier 7.

Advantageously from a practical and esthetic aspect, the second recesses 21 are present on both outer edges at the same height and in the same size, so that a pair of these recesses 21 respectively come to lie one above the other, regardless of which of the faces of the sheet segments 2 are facing outward in the assembled state. For the sheet segments 2, a transparent material, preferably colorless plastic or glass, is used.

Figure 1B:
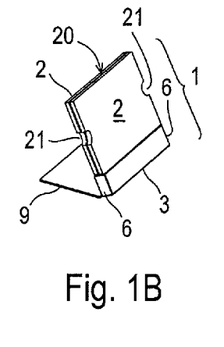
FIG. 1B shows the arrangement according to FIG. 1A, in oblique set-up.
Figure 1C:
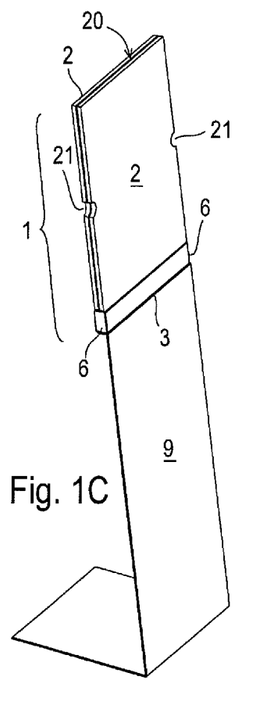
FIG. 1C shows the arrangement according to FIG. 1B, with elevated plate-like stand as the supporting structure.
Figure 1D:
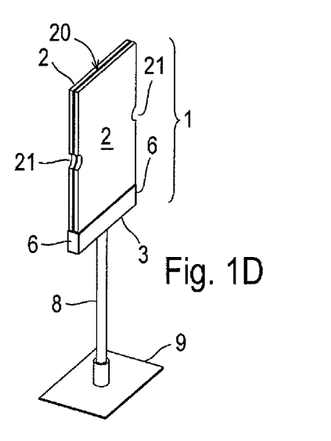
FIG. 1D shows the arrangement according to FIG. 1A, with an adapter between the base and the supporting structure.

The arrangement according to FIG. 1B differs only insofar as the supporting structure 9 in the form of a plate-like stand produces an oblique set-up of the holding device 1. According to FIG. 1C, the holding device 1 is configured in portrait format, the plate-like stand as the supporting structure 9 is elevated and likewise produces an oblique set-up. In the construction according to FIG. 1D, the holding device 1 is once again configured in portrait format and the base 3 is located beneath the sheet segments 2, but now an adapter 8, configured as a supporting rod, extends between the base 3 and the plate-like supporting structure 9. In the construction according to FIG. 1E, a vertical support serves as the supporting structure 9 and the holding device 1 is shaped in landscape format. In the application according to FIG. 1F, the supporting structure 9 is once again a vertical support, which now, however, is mounted on a wall component 90. In the construction according to FIG. 1G, a horizontal support is used as the supporting structure 9, to which wall components 90 are adjoined from above and below in a vertical plane. In FIG. 1H, the supporting structure 9 is formed by a square tube, the holding device 1 firstly being supported by an adapter 8 which is affixed to the bottom side of the base 3 and the connecting contour 86 of which can be docked to the supporting structure 9. According to FIG. 1J, in place of the square tube used in FIG. 1H, a round tube is used as the supporting structure 9.

Figure 2:
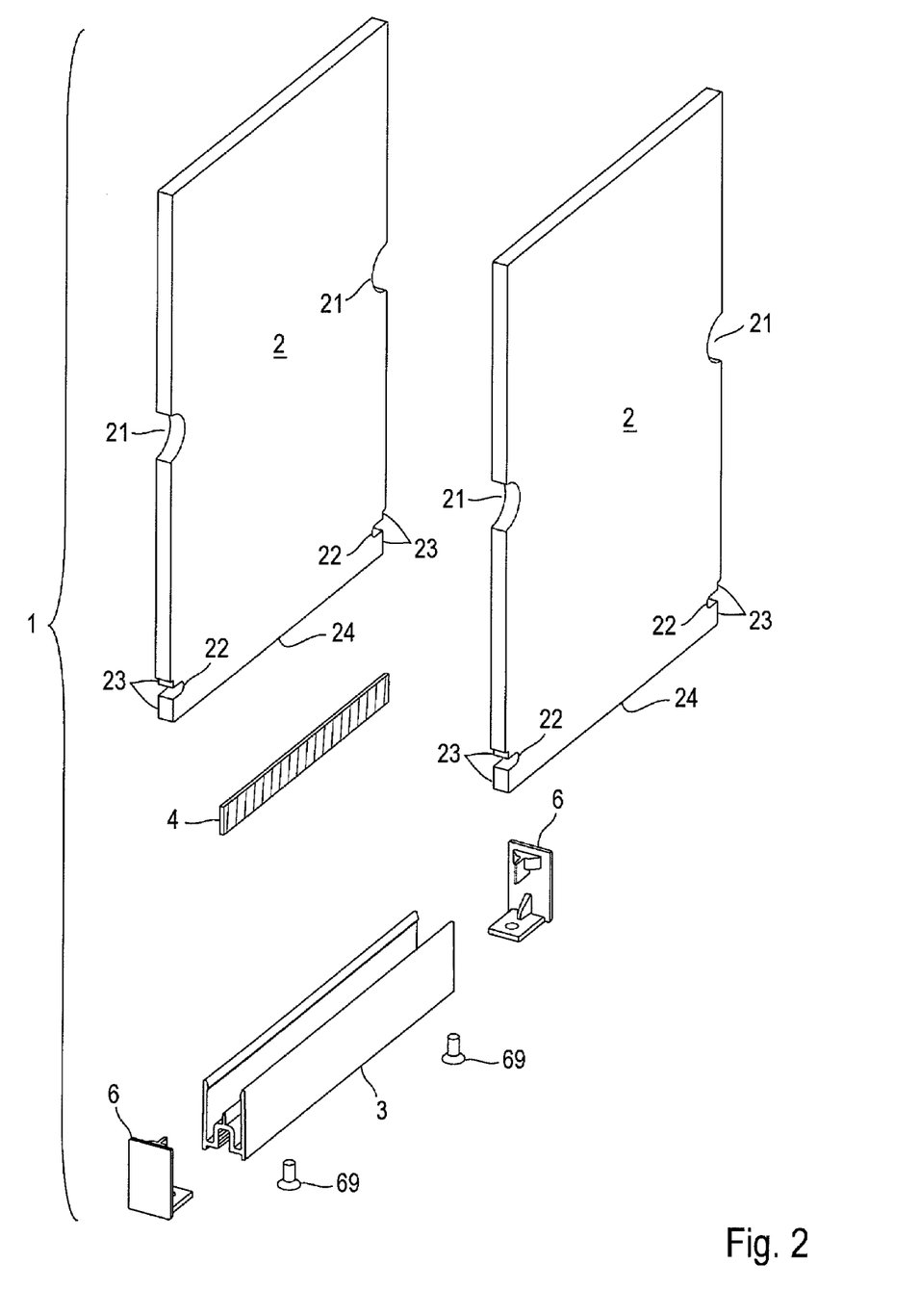
FIG. 2 shows the holding device from FIG. 1C, in perspective exploded view.

FIG. 2

The sheet segment 2 shaped in portrait format has, in addition to the two second recess 21 which are respectively present on one of its side edges, on these side edges, close to the bottom edge 24 facing the base 3, respectively a first recess 22. Beyond the first recess 22, a clearance cut 23 extends along the outer edge, on the one hand continuously as far as the bottom edge 24 and on the other hand over a short distance in the direction of the second recess 21. The first recesses 22 and the respectively associated clearance cut 23 are arranged in mirror symmetry at the same level on the sheet segments 2. Also belonging to the holding device 1 are a strip-shaped spacing element 4, preferably of colorless plastic, a long profile piece of the base 3, which profile piece corresponds to the planned dimensioning of the holding device 1, the two corner parts 6 and screws 69.

Figure 3A:
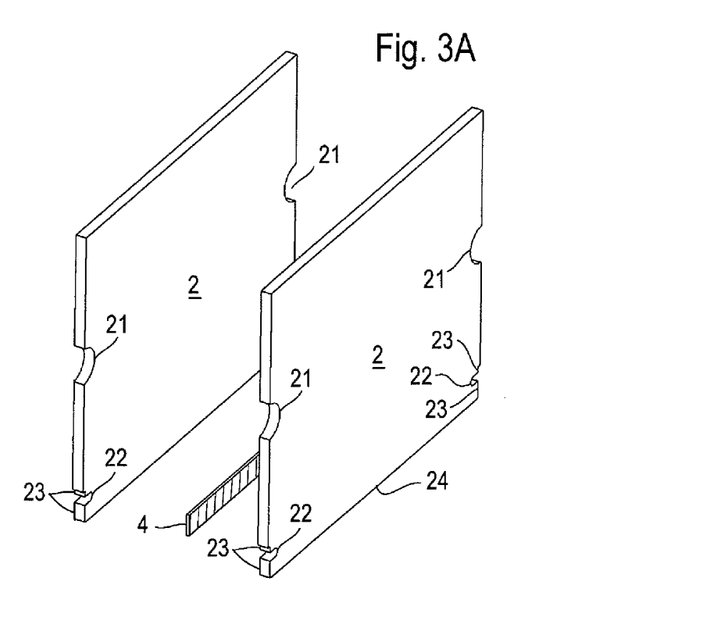
FIG. 3A shows two sheet segments in landscape format with the spacing element according to FIG. 2, in perspective exploded view.
Figure 3B:
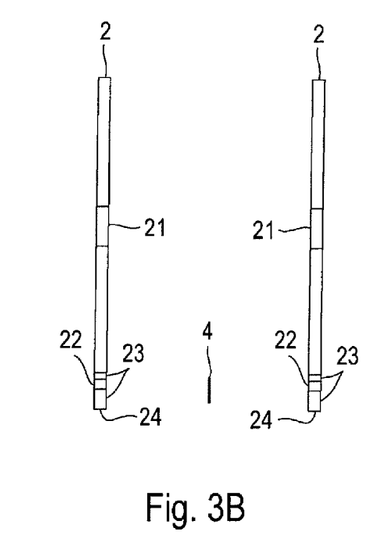
FIG. 3B shows the arrangement according to FIG. 3A, in side view.

FIGS. 3A and 3B

In this pair of figures, the two sheet segments 2 are shaped in landscape format, so that their side edges containing the recesses 21,22 and the clearance cuts 23 are shorter than the top edge and bottom edge 24. The length of the profile piece of the base 3 and of the spacing element 4 shall be dimensioned accordingly.

Figure 4A:
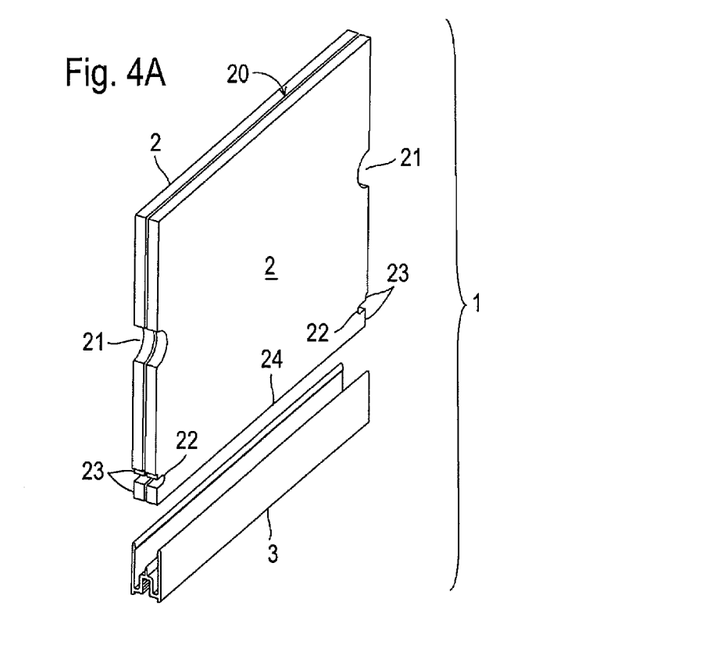
FIG. 4A shows two sheet segments and the spacing element according to FIG. 3A fitted together, with neared base, in perspective view.
Figure 4B:
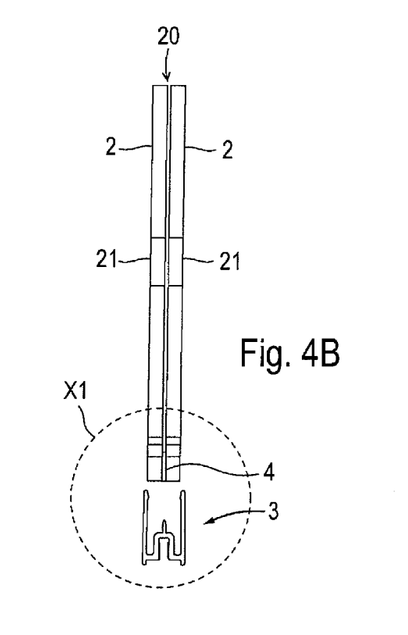
FIG. 4B shows the arrangement according to FIG. 4A, in side view.
Figure 4C:
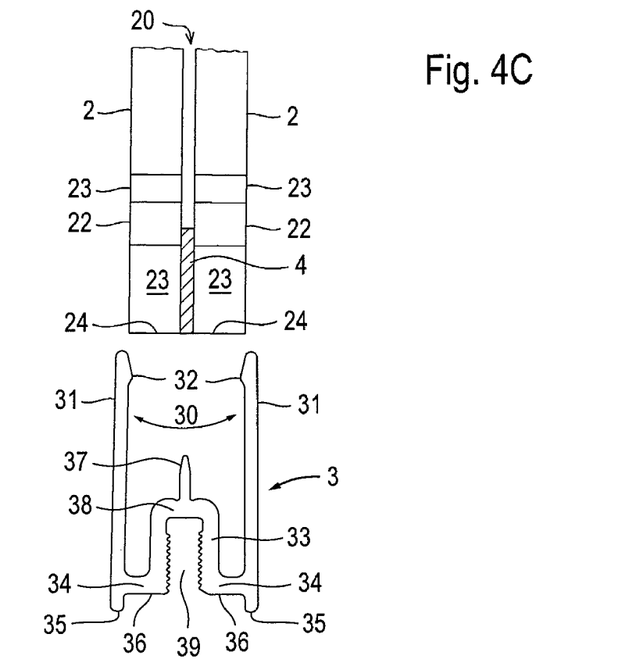
FIG. 4C shows the enlarged detail X1 from FIG. 4B.

FIGS. 4A to 4C

The two sheet segments 2 and the spacing element 4 are joined together congruently, in which case the latter, at the start of the assembly, generally terminates with the flush bottom edges 24 of the sheet segments 2, lies between the first recesses 22 present in pairs on both sides and extends upward to the level of about half the height of the first recesses 22. The base 3 is in principle a portion of a U-profile having two side members 31, which act as a leaf spring and enclose between them a free space 30 that is open on one side. Extending respectively at right angles from the side members 31 is a branch 34, the branches 34 being directed one toward the other and respectively merging into a flank 33, which flanks run parallel to the side members 31. The two flanks 33 are bridged by a transverse web 38 and have between them a screw channel 39, which, facing away from the free space 30, is open. The free space 30 is thus delimited by the respectively two branches 34 and flanks 33 with the transverse web 38 in a meandering pattern. Each side member 31 possesses a latching contour 32 pointing to the entrance into the free space 30. From the center of the transverse web 38, a web 37 extends into the free space 30. The side members 31 respectively run with a projecting length 35 beyond the respectively associated branch 34 and form with the latter a shoulder 36. The two shoulders 36 lie in one plane and run up to the mouth of the screw channel 39. The shoulders 36 with the screw channel 39 can be used for fastening a connecting part 81 of an adapter 8 (see FIGS. 8A-8C). Preferably, the base 3 consists of an aluminum extruded profile.

Figure 5A:
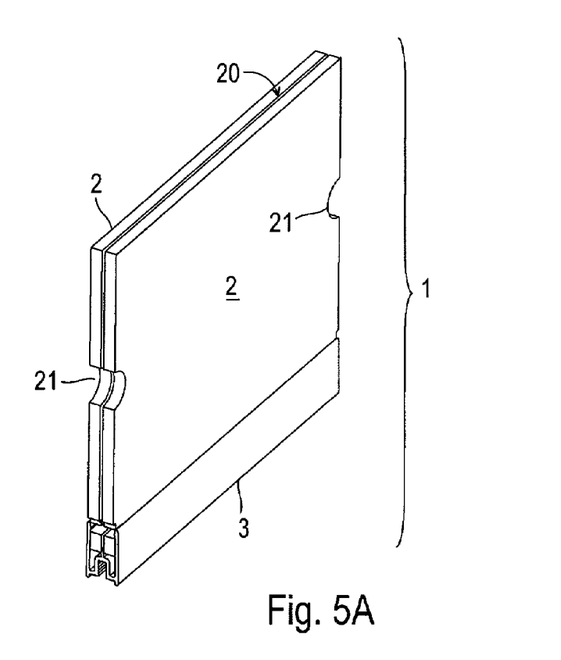
FIG. 5A shows the arrangement according to FIG. 4A, with sheet segments partially inserted into the base, and spacing element, in perspective view.
Figure 5B:
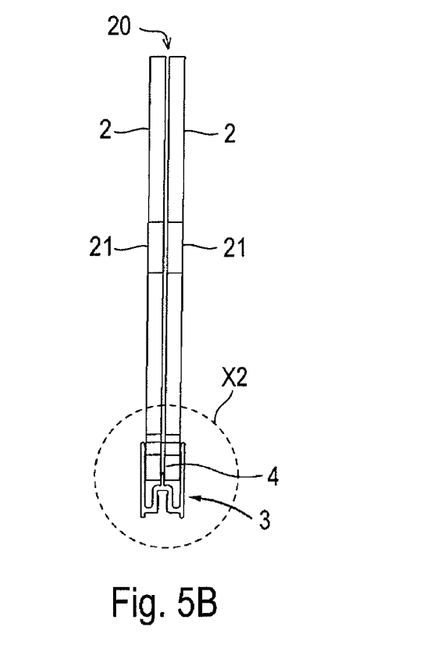
FIG. 5B shows the arrangement according to FIG. 5A, in side view.
Figure 5C:
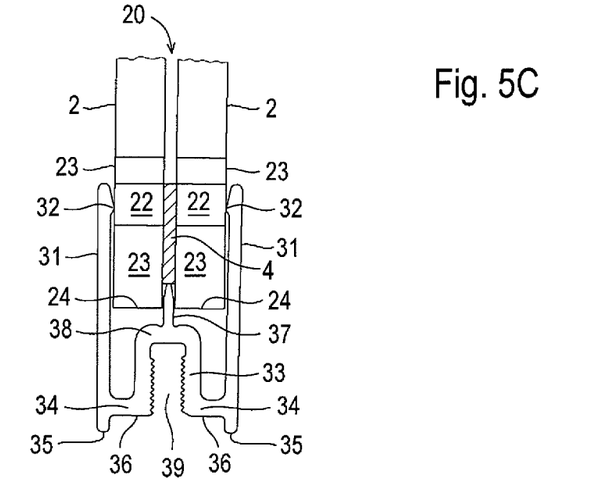
FIG. 5C shows the enlarged detail X2 from FIG. 5B.
Figure 6A:
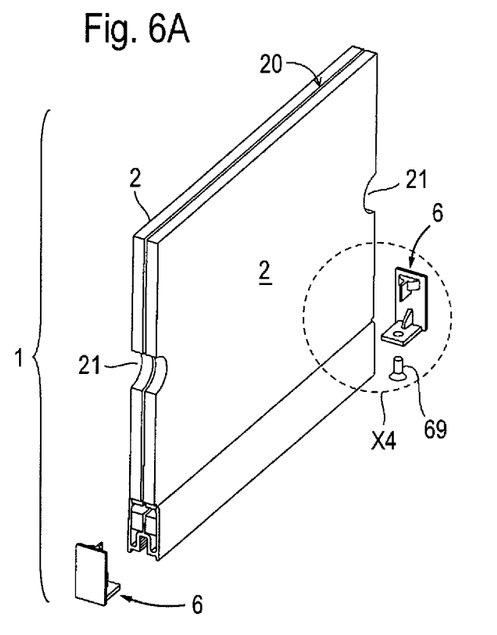
FIG. 6A shows the arrangement according to FIG. 5A, with sheet segments maximally inserted into the base, and spacing element, as well as with neared corner parts, in perspective view.
Figure 6B:
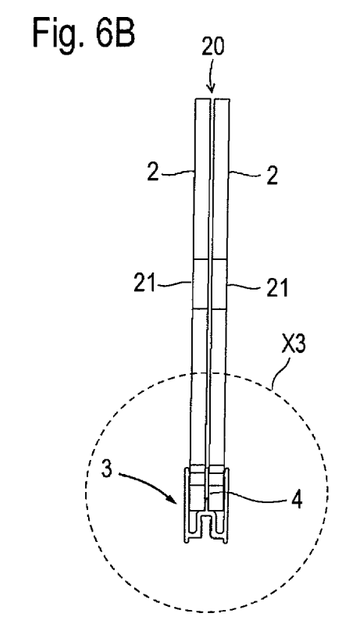
FIG. 6B shows the arrangement according to FIG. 6A, without the corner parts, in side view.
Figure 6C:
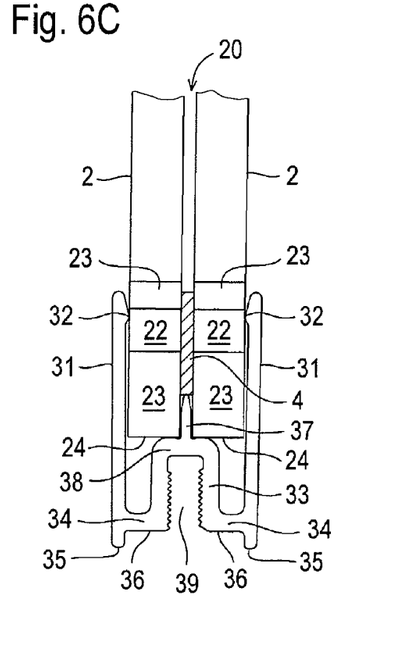
FIG. 6C shows the enlarged detail X3 from FIG. 6B.
Figure 6D:
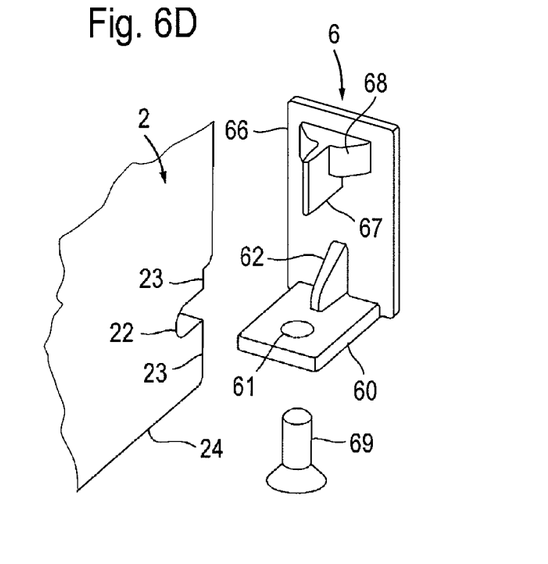
FIG. 6D shows the enlarged detail X4 from FIG. 6A, without the base.

FIGS. 5A to 5C

The assembly comprising the two sheet segments 2 with the intervening spacing element 4 is partially inserted in the free space 30 of the base 3, so that the bottom edges 24 are not yet seated on the transverse web 38. The side members 31 enclasp with elastic contact pressure the two sheet segments 2 and, at the same time, the web 37 travels into the gap 20 produced by the spacing element 4 and thereupon pushes the spacing element 4 progressively further in between the sheet segments 2.

FIGS. 6A to 6D

The sheet segments 2 with the spacing element 4 are maximally inserted in the base 3 and, for the continuation of the assembly, a corner part 6 is respectively provided, with which the cut face open at the end of the base 3 is covered and, at the same time, the inserted sheet segments 2 are connected to the base 3. Through further penetration of the web 37 into the gap 20, the spacing element 4 has pushed deeper between the sheet segments 2 and projects to the level of the offsets 23. The sheet segments 2 are seated with their bottom edges 24 on the transverse web 38.

The one-piece corner part 6 has a first angle segment 60 and a second angle segment 66, between which, on the inner side, a rib 62 extends. The first angle segment 60 has a hole 61 for the introduction of a screw 69. The second angle segment 66 has on the inner side a projection 68, from which rises a blade-shaped pin 67. In the assembled state, the rib 62 fits laterally into the screw channel 39, the screw 69 engages in the screw channel 39, the projection 68 sits in the two first recesses 22 of the two adjacently positioned sheet segments 2, the pin 67 juts, in alignment with the web 37 of the base 3, between the sheet segments 2, and the thickness of the second angle segment 66 fits into the clearance cut 23 on the sheet segments 2, whereby the outer face of the second angle segment 66 terminates flush with the outer edges of the sheet segments 2. At the same time, the first angle segment 60 is embedded against the shoulders 36 of the base 3.

Figure 7A:
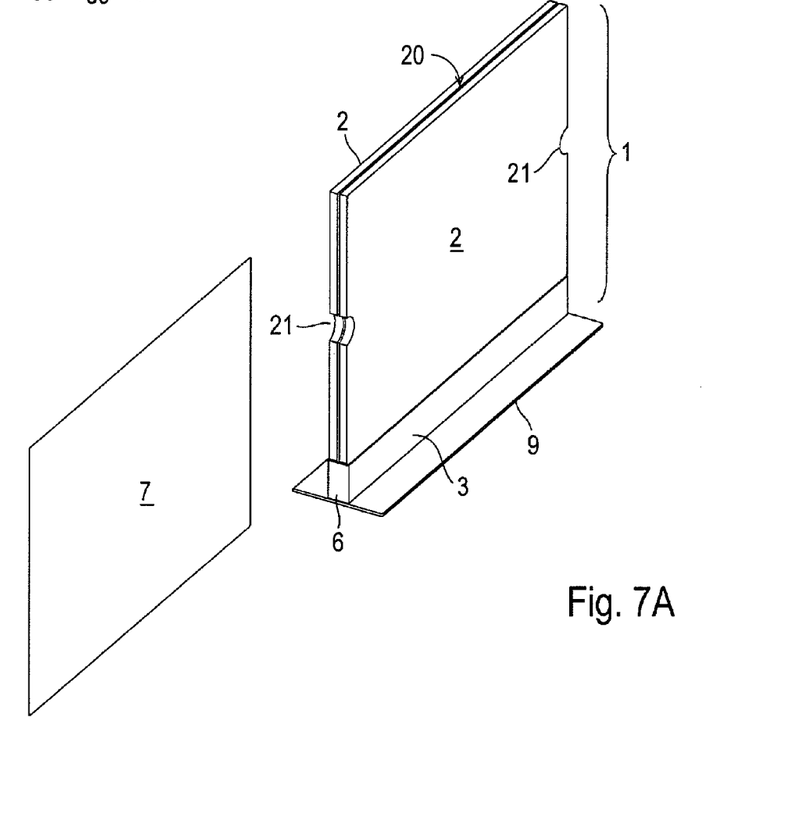
FIG. 7A shows the arrangement according to FIG. 1A, with neared information carrier, in perspective view.
Figure 7B:
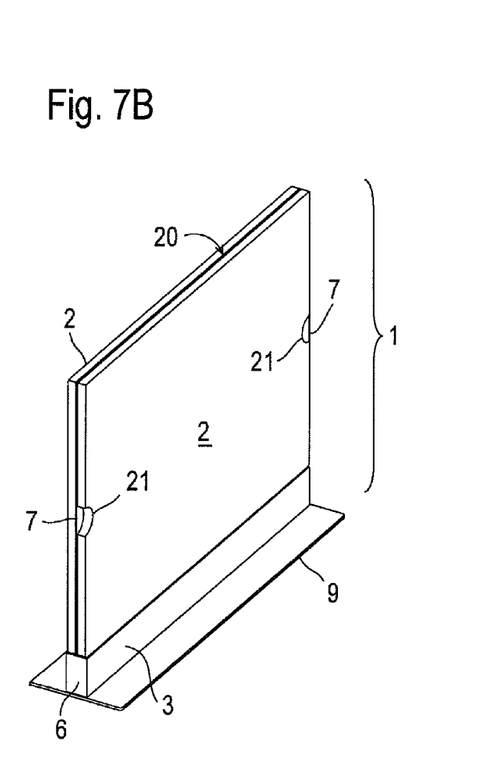
FIG. 7B shows the arrangement according to FIG. 7A, with information carrier inserted in the holding device, in perspective view.

FIGS. 7A and 7B

The poster-shaped information carrier 7 for the equipping of the holding device 1 is expediently shaped in a plane which is congruent to the plane spanned by the sheet segments 2 outside the base 3, so that the inserted information carrier 7 on the one hand fills the gap 20 over the whole of its extent and on the other hand does not project between the sheet segments 2, apart from the two recesses 21. The information carrier 7 terminating flush with the outer periphery of the holding device 1 juts into the two second recesses 21 and can thus be easily grasped for removal purposes. The information carrier 7 is prevented from sliding into the region of the base 3 by the spacing element 4 which lies between the sheet segments 2 and is impinged upon by the information carrier 7.

Figure 8A:
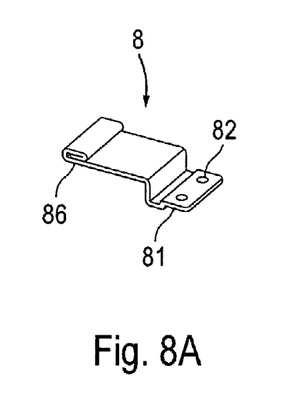
FIG. 8A shows an adapter in a first variant for use with a horizontal support as the supporting structure according to FIG. 1G.
Figure 8B:
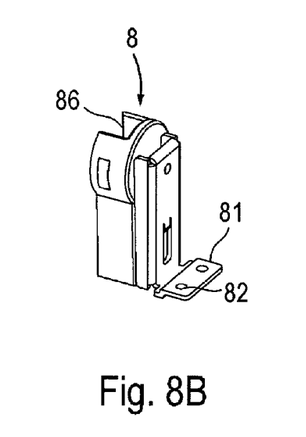
FIG. 8B shows an adapter in a second variant for use with a vertical support as the supporting structure according to FIG. 1E.
Figure 8C:
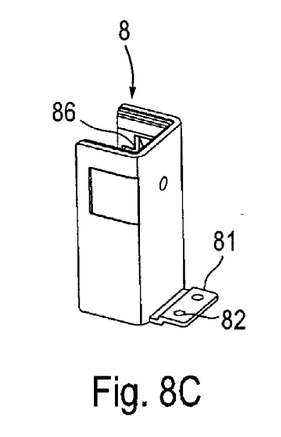
FIG. 8C shows an adapter in a third variant for use with a vertical support as the supporting structure according to FIGS. 1F and 11.

FIGS. 8A to 8C

For the docking to the variously configured supporting structures 9, complementary adapters 8 are respectively provided. In a first variant (see FIG. 8A), which is used in connection with the specific horizontal support according to FIG. 1G and as the subject of European patent EP 1 152 675 B1 of the Applicant, the adapter 8 has a plate-like connecting part 81 with holes 82 present therein, as well as a raised connecting contour 86. The connecting part 81 can be fastened to the shoulders 36 of the base 3 in countersunk arrangement by means of the screws 69 which engage in the screw channel 39. The connecting contour 86 is intended for secured hanging in the horizontal support.

Figure 1E:
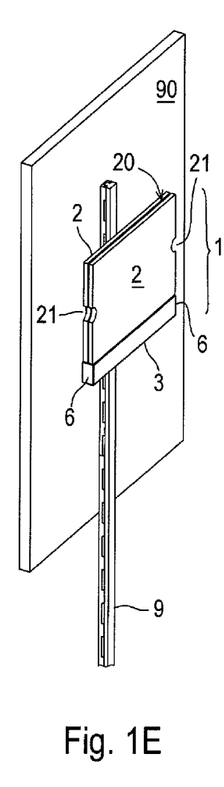
FIG. 1E shows the arrangement according to FIG. 1A, with a vertical support as the supporting structure and an adjoined wall component.
Figure 1F:
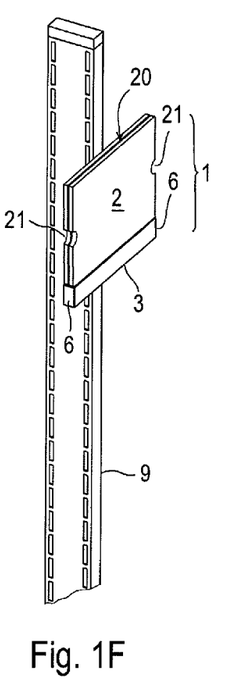
FIG. 1F shows the arrangement according to FIG. 1A, with a vertical support as the supporting structure.
Figure 1G:
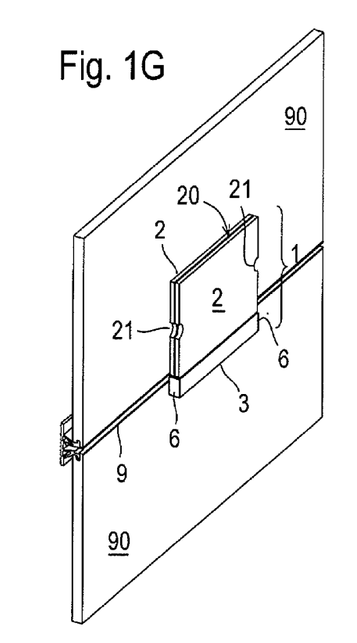
FIG. 1G shows the arrangement according to FIG. 1A, with a horizontal support as the supporting structure and wall components adjoined thereto.
Figure 1H:
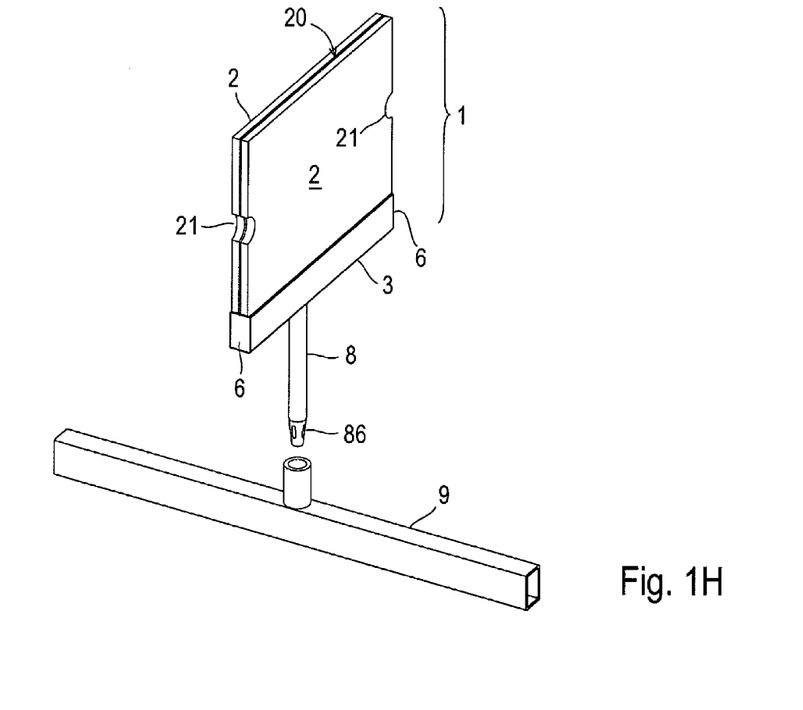
FIG. 1H shows the arrangement according to FIG. 1A, supported by a square tube as the supporting structure, with an adapter between the base and the supporting structure.
Figure 1J:
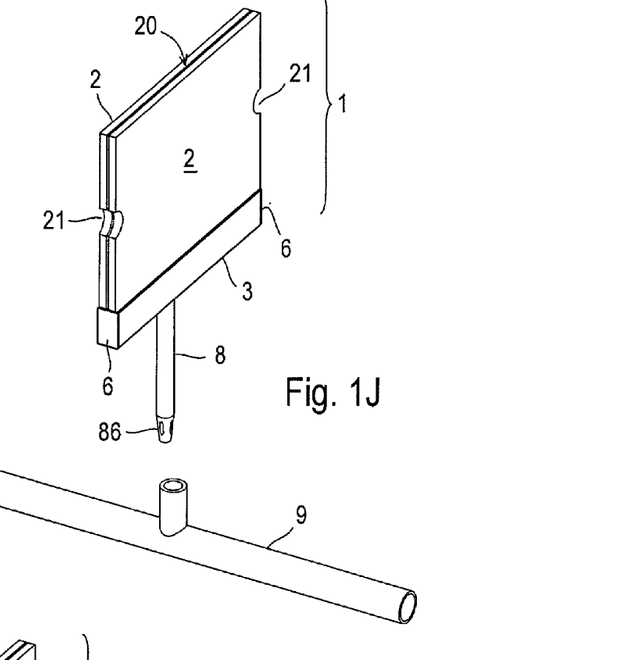
FIG. 1J shows the arrangement according to FIG. 1H, supported by a round tube as the supporting structure, with an adapter between the base and the supporting structure.

The second variant of the adapter 8 (see FIG. 8B) is used in connection with the specific vertical support from FIG. 1E and as the subject of European patent EP 1 312 287 B1 of the Applicant. The connecting part 81 is unaltered, but the connecting contour 86 now serves to encompass the vertical support on three sides in a locked manner. The third variant of the adapter 8 (see FIG. 8C) is used in connection with the specific vertical support from FIG. 1F. The connecting part 81 remains still unaltered and the modified connecting contour 86 serves once again to encompass the modified vertical support on three sides in a locked manner.

Figures 9, 10A, 10B:
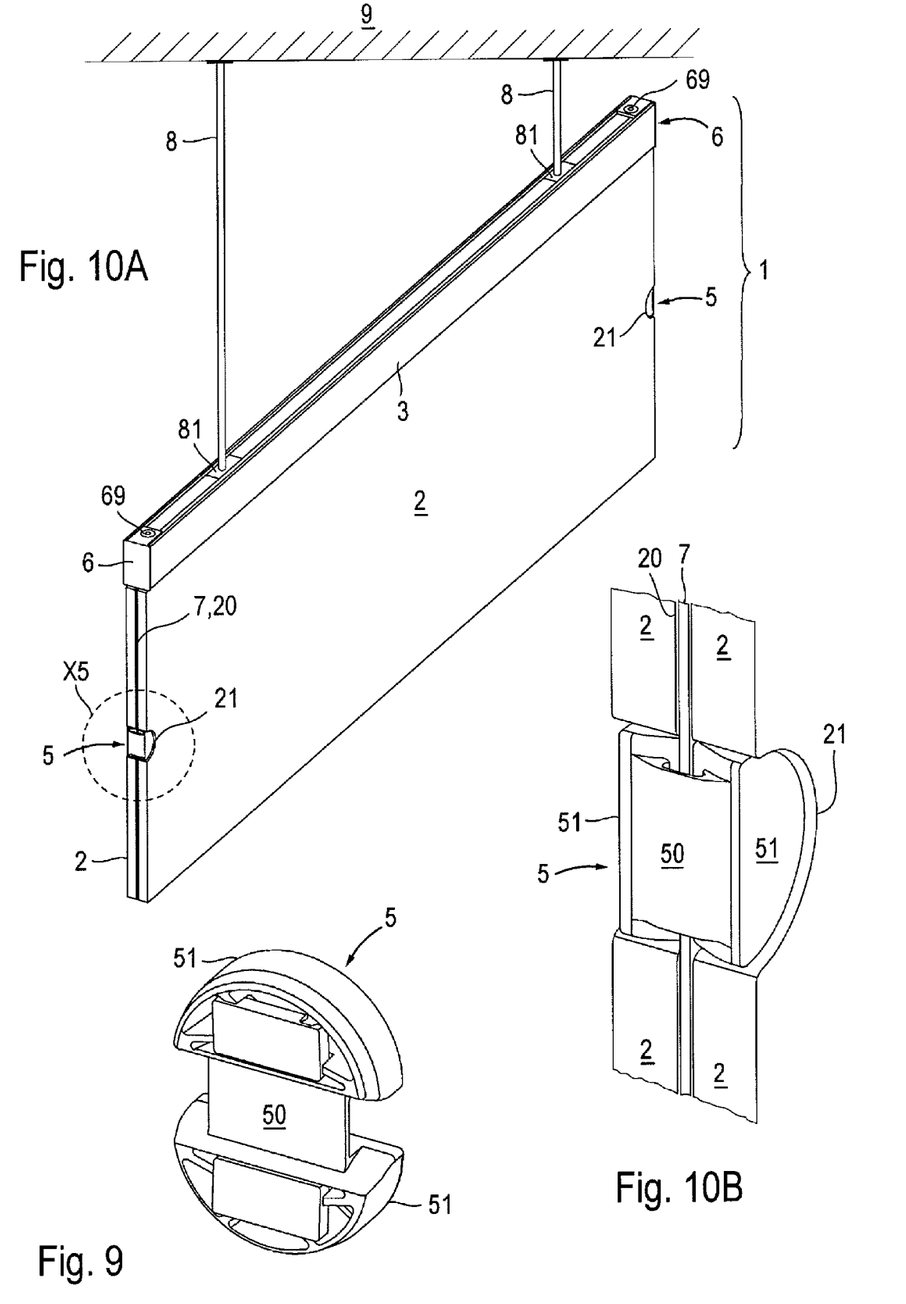
FIG. 9 shows a clamping part, opened, in perspective view.
FIG. 10A shows a holding device according to the invention in vertical suspension with the base above the sheet segments, supported by cord-shaped adapters which extend to the supporting structure in the form of a ceiling, the information carrier being fixed in place with clamping parts, in perspective view.
FIG. 10B shows the enlarged detail X5 from FIG. 10A.
Figure 11:
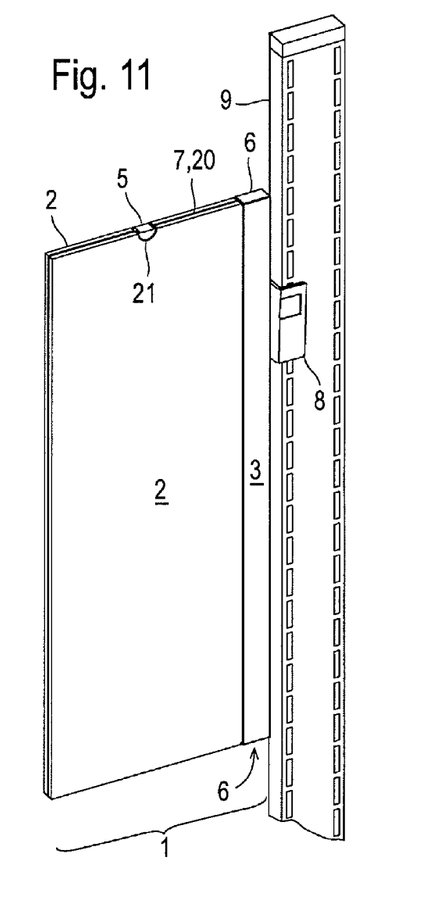
FIG. 11 shows a holding device according to the invention in vertical suspension with the base lateral to the sheet segments, supported by an adapter according to FIG. 8C, which attaches to a supporting structure in the form of a vertical support, the information carrier being fixed in place with a clamping part, in perspective view.

FIGS. 9 to 11

The clamping part 5 has a complementary contour to the second recess 21 on the sheet segments 2 and consists of two jaws 51 interconnected by a bridge 50, which jaws can be closed in a clip-like manner in order to encompass the information carrier 7 on both sides in the region of the second recess 21 and thus fix it in place in an intrinsically loose-fitting manner in the holding device 1. Insofar as the base 3 is located beneath the sheet segments 2, as shown in FIGS. 1A-1J, there is no need for the clamping parts 5, since the information carrier 7, by virtue of its gravitational force, is seated on the spacing element 4. Clamping parts 5 will however be used when the inserted information carrier 7 has to be secured against lateral slippage.

When the holding device 1 is used with the sheet segments 2 beneath the base 3, which is suspended, for example, by means of cord-shaped adapters 8 and associated connecting parts 81, from a supporting structure 9 in the form of a ceiling, clamping parts 5 are used for both pairs of second recesses 21, particularly in larger sized holding devices 1, to fix the inserted information carrier 7 in place, since this would otherwise fall to the ground. To this end, the second recesses 21 are disposed in the side edges of the sheet segments 2 (see FIGS. 10A, 10B).

Similarly, when the holding device 1 is used with the base 3 laterally against the sheet segments 2, the use of at least one clamping part 5 for fixing of the inserted information carrier 7 is demanded. Preferably, the second recess 21 with the clamping part 5 will be provided on the upmost positioned outer edge of the sheet segments 2 (see FIG. 11). A second recess 21 also on the bottommost positioned outer edge of the sheet segments 2 could be dispensed with, but it would probably be expedient to arrange the second recesses 21 in mirror symmetry in order to obtain the greatest possible scope in the positioning of the holding device 1.

The invention claimed is:

1. A holding device (1) for a poster-shaped information carrier (7), comprising:
  a) two sheet segments (2) for receiving the information carrier (7) therebetween, at least one of the sheet segments (2) being transparent in order for the information carrier to be visible, and
  b) a base (3) for the insertion of the two sheet segments (2), characterized in that
  c) a means (4,37) is provided for maintaining a gap (20) between the two sheet segments (2) for receiving the information carrier (7),
  d) the thickness of the sheet segments (2) corresponds to a clear width between a side member (31) and a web (37);
  e) the sheet segment (2) has respectively in the region of the base (3), on both outer edges, a first recess (22);
  f) a clearance cut (23) extends beyond the first recess (22) along the outer edge, on the one hand continuously as far as the bottom edge (24) and on the other hand over a short distance in the direction of a second recess (21); and
  g) outside the base (3), the sheet segment (2) has at least on one of its outer edges the second recess (21), which serves as a grip recess for the grasping of an information carrier (7) present in the holding device (1) and/or for the application of a clamping part (5) to the information carrier (7).

2. The holding device (1) as claimed in claim 1, characterized in that the means (4,37) for maintaining the gap (20) between the two sheet segments (2):
   a) is a web (37), which is disposed in the base (3) and juts between the sheet segments (2); and/or
   b) is a spacing element (4), which lies between the sheet segments (2).

3. The holding device (1) as claimed in claim 1 or 2, characterized in that
   a) the base (3) is configured in principle as a U-profile with two side members (31), which act as a leaf spring and enclose between them a free space (30) which is open on one side;
   b) extending from each of the side members (31) is a branch (34), which branches (34) are directed one toward the other and merge respectively into a flank (33), the two flanks (33) being bridged by a transverse web (38) and having between them a screw channel (39) which is open facing away from the free space (30);
   c) the respectively two branches (34) and flanks (33) with the transverse web (38) delimit the free space (30) in a meandering pattern;
   d) each side member (31) possesses a latching contour (32) pointing to the entrance into the free space (30); and
   e) the web (37) rises up centrally from the transverse web (38) into the free space (30).

4. The holding device (1) as claimed in claim 3, characterized in that
   a) the side members (31) respectively extend with a projecting length (35) beyond the respectively associated branch (34) and form with this a shoulder (36);
   b) the two shoulders (36) lie in one plane and run up to the mouth of the screw channel (39);
   c) the shoulders (36) with the screw channel (39) can be used to fasten a connecting part (81) of an adapter (8); and
   d) the base (3) consists of an extruded profile.

5. The holding device (1) as claimed in claim 1, characterized in that
   the two sheet segments (2) are identical, namely have the same shaping and consist of the same transparent material.

6. The holding device (1) as claimed in claim 1, characterized in that
   b) the clamping part (5) has complementary to the contour of the second recess (21) two jaws (51) interconnected by a bridge (50), which jaws can be closed in the manner of a clip in order to encompass the information carrier (7) on both sides in the region of the second recess (21), and thus fix it in place.

7. The holding device (1) as claimed in claim 1, characterized in that
   a) a spacing element (4) is provided, which in an assembled state is seated on the web (37) of the base (3) between the two sheet segments (2) and between pins (67) of mounted corner parts (6) that jut in;
   b) the sheet segments (2) inserted in the base (3) are seated on a transverse web (38) of the base (3); and
   c) an edge of the spacing element (4) which points away from the base (3) forms a stop for the inserted information carrier (7).

8. The holding device (1) as claimed in claim 1, characterized in that
   a) the holding device (1) can be positioned with the base (3) beneath or above or lateral to the sheet segments (2);
   b) a supporting structure (9) is a tubular stand, a panel, a rack, a rear wall or a ceiling and between the base (3) an adapter (8) can be used for connection to the supporting structure (9);
   c) the adapter (8) possesses a connecting part (81), which is intended for joining to a two-part shoulder (36) and fixing to a screw channel (39) of the base (3); and
   d) the adapter (8) has a connecting contour (86) for releasable docking to the supporting structure (9).

9. A holding device (1) for a poster-shaped carrier(7), comprising:
   a) two sheet segments (2) for receiving the information carrier (7) therebetween, at least one of the sheet segments (2) being transparent in order for the information carrier to be visible, and
   b) a base (3) for the insertion of the two sheet segments (2), characterized in that
   c) a means (4,37) is provided for maintaining a gap (20) between the two sheet segments (2) for receiving the information carrier (7);
   d) at each end, the base (3) is respectively provided with a corner part (6), which serves to cover cut faces at the ends of the base (3) and to fix the two sheet segments (2) present in the base (3);
   e) an one-piece corner part (6) has a first angle segment (60) and a second angle segment (66), between which, on the inner side, a rib (62) extends, which can be fitted laterally into a screw channel (39);
   f) the first angle segment (60) is intended to bear against shoulders (36) of the base (3) and additionally has a hole (61) for the introduction of a screw (69) which engages in the screw channel (39);
   g) the second angle segment (66) has on the inner side a projection (68), from which rises a blade-shaped pin (67), and
   h) the projection (68) engages in two first recesses (22) of the two adjacently positioned sheet segments (2), the pin (67) juts, in alignment with a web (37) of the base (3), between the sheet segments (2) and the thickness of the second angle segment (66) fits into a clearance cut (23), whereby the outer face of the second angle segment (66) terminates flush with outer edges of the sheet segments (2).

* * * * *

UNITED STATES PATENT AND TRADEMARK OFFICE
CERTIFICATE OF CORRECTION

PATENT NO. : 8,220,190 B2
APPLICATION NO. : 12/747431
DATED : July 17, 2012
INVENTOR(S) : Herbert Walter Page 1 of 1

It is certified that error appears in the above-identified patent and that said Letters Patent is hereby corrected as shown below:

On the face page of the patent, insert --Foreign Priority: Germany 20 2007 017 252.4   12/11/2007--.

Signed and Sealed this
Ninth Day of October, 2012

David J. Kappos
*Director of the United States Patent and Trademark Office*